US009982610B2

(12) United States Patent
Lee et al.

(10) Patent No.: US 9,982,610 B2
(45) Date of Patent: May 29, 2018

(54) CONTROL METHOD OF BOOSTING APPARATUS

(71) Applicant: Hyundai Motor Company, Seoul (KR)

(72) Inventors: Jung Sub Lee, Yongin-si (KR); Young Ho Kim, Hwaseong-si (KR); Hyo Sang Cho, Suwon-si (KR); Seung Eun Yu, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 89 days.

(21) Appl. No.: 15/155,454

(22) Filed: May 16, 2016

(65) Prior Publication Data

US 2017/0152799 A1 Jun. 1, 2017

(30) Foreign Application Priority Data

Nov. 30, 2015 (KR) .......................... 10-2015-0168771

(51) Int. Cl.
*F02D 41/00* (2006.01)
*F01N 3/021* (2006.01)
(Continued)

(52) U.S. Cl.
CPC ........... *F02D 41/005* (2013.01); *F01N 3/021* (2013.01); *F01N 3/2066* (2013.01); *F02B 37/04* (2013.01);
(Continued)

(58) Field of Classification Search
CPC .. F02D 41/005; F02D 41/2422; F02D 41/187; F02D 41/0007; F02D 41/0077;
(Continued)

(56) References Cited

U.S. PATENT DOCUMENTS 5,771,868 A * 6/1998 Khair ...................... F02B 33/32
123/568.12
6,209,324 B1 * 4/2001 Daudel ............... F02B 29/0406
123/322
(Continued)

FOREIGN PATENT DOCUMENTS

JP 2001-82259 3/2001
JP 2007-247540 9/2007
(Continued)

*Primary Examiner* — Hoang Nguyen
(74) *Attorney, Agent, or Firm* — Brinks Gilson & Lione

(57) ABSTRACT

A control method of a boosting apparatus includes: driving the boosting apparatus according to driving maps pre-input to a controller, judging driving conditions of an engine, selecting a driving map pre-input to the controller and reflecting the driving conditions in the selected driving map, correcting the driving maps of the boosting apparatus based on the selected driving map and driving the boosting apparatus based on the corrected driving maps, and confirming whether variations in operating amounts of the boosting apparatus are generated and, when the variations are confirmed, correcting the operating amounts of the boosting apparatus and reflecting the corrected operating amounts in the driving maps. In particular, the controller controls an EGR valve according to driving conditions through operation of the boosting apparatus and thus controls the amount of EGR gas supplied to the engine.

10 Claims, 3 Drawing Sheets

(51) Int. Cl.
  *F02B 37/04* (2006.01)
  *F01N 3/20* (2006.01)
  *F02D 41/18* (2006.01)
  *F02D 41/24* (2006.01)
  *F02D 41/02* (2006.01)
  *F02D 41/14* (2006.01)

(52) U.S. Cl.
  CPC ..... *F02D 41/0007* (2013.01); *F02D 41/0077* (2013.01); *F02D 41/187* (2013.01); *F02D 41/2422* (2013.01); *F02D 41/027* (2013.01); *F02D 41/029* (2013.01); *F02D 41/1456* (2013.01); *Y02T 10/144* (2013.01); *Y02T 10/47* (2013.01)

(58) Field of Classification Search
  CPC .. F02D 41/027; F02D 41/029; F02D 41/1456; F01N 3/021; F01N 3/2066; F02B 37/04
  USPC ...... 60/600, 602, 605.2; 123/568.11, 568.19, 123/564
  See application file for complete search history.

(56) References Cited

U.S. PATENT DOCUMENTS

| | | | | |
|---|---|---|---|---|
| 6,637,205 | B1* | 10/2003 | Ahmad | F02B 37/04 60/607 |
| 2003/0024499 | A1* | 2/2003 | Umezono | F02B 31/085 123/301 |
| 2012/0090584 | A1* | 4/2012 | Jung | F02D 41/0065 123/568.12 |
| 2013/0269327 | A1 | 10/2013 | Keppeler | |
| 2014/0182565 | A1* | 7/2014 | Kim | F02B 37/04 123/565 |
| 2014/0305412 | A1* | 10/2014 | Ahrns | F02B 37/14 123/562 |

FOREIGN PATENT DOCUMENTS

| | | |
|---|---|---|
| JP | 2008-163794 | 7/2008 |
| JP | 2014-98324 | 5/2014 |
| KR | 10-2003-0013599 | 2/2003 |

* cited by examiner

CONTROL METHOD OF BOOSTING APPARATUS

CROSS-REFERENCE TO RELATED APPLICATION

This application claims priority to and the benefit of Korean Patent Application No. 10-2015-0168771, filed on Nov. 30, 2015, which is incorporated herein by reference in its entirety.

FIELD

The present disclosure relates to a control method of a boosting apparatus in an engine system.

BACKGROUND

The statements in this section merely provide background information related to the present disclosure and may not constitute prior art.

In an engine system including a boosting apparatus, an exhaust gas recirculation (EGR) system in which a part of exhaust gas is re-circulated to an intake side has been developed and commercialized as technology to reduce NOx exhausted from an engine or to improve fuel efficiency.

In the above-described EGR system, a controller controls EGR gas relative to an amount of intake air in a form of flow rate. In more detail, in adjusting the supply of EGR gas based on differential pressure between intake pressure and exhaust pressure and the open degree of an EGR valve, the supply amount of EGR gas is controlled so as to satisfy an EGR rate which is pre-inputted to the controller.

Further, a turbocharger is provided between an exhaust line and an intake line of an engine, and a turbine rotates at a high speed by the pressure of exhaust gas to compress intake air using a compressor and to supply the compressed air to an intake side so as to improve charging efficiency of intake air. Therefore, in the engine provided with the turbocharger, an EGR rate is controlled by adjusting the supply amount of EGR gas based on a differential pressure between boost pressure compressed by the turbocharger and exhaust pressure and the open degree of an EGR valve.

However, we have discovered that when the engine is excessively driven (suddenly accelerated, etc.), boost pressure and exhaust pressure are greatly changed by operation of the turbocharger and, thus, the EGR rate may not be properly controlled. If the EGR rate is not properly controlled, EGR gas may be excessively increased and thus generate smoke or EGR gas may be excessively decreased and thus increase NOx or noise and deteriorate exhaust gas purification performance.

SUMMARY

The present disclosure provides a control method of a boosting apparatus in which driving efficiency of an engine may be increased by controlling the supply amount of EGR gas through control of a turbocharger and supercharger according to driving conditions of the engine.

The present disclosure provides a control method of a boosting apparatus, the method including: driving the boosting apparatus according to driving maps pre-input to a controller; judging driving conditions of an engine; selecting a driving map pre-input to the controller and reflecting the driving conditions in the selected driving map by the controller; correcting the driving maps of the boosting apparatus based on the selected driving map of the engine, in which the driving conditions are reflected, and driving the boosting apparatus based on the corrected driving maps by the controller; and confirming whether or not variations in operating amounts of the boosting apparatus are generated and, upon confirming that variations of operating amounts are generated, correcting the operating amounts of the boosting apparatus and reflecting the corrected operating amounts in the driving maps by the controller. In particular, the controller is configured to control an EGR valve according to driving conditions through operation of the boosting apparatus and thus control the amount of EGR gas supplied to the engine.

The boosting apparatus may include a supercharger and a turbocharger, and the supercharger and the turbocharger may be simultaneously controlled.

In the correcting of the operating amounts of the boosting apparatus, a corrected value of the operating amount of the turbocharger may be reflected in the driving map of the supercharger and thus the operating amount of the supercharger may be controlled.

The controller may correct the operating amount of the supercharger by executing inverse operation of the amount of EGR gas based on the amount of oxygen in exhaust gas detected by a detection unit and thus control the open degree of the EGR valve.

In the correcting of the operating amounts of the boosting apparatus, the controller is configured to receive the boost pressure of the turbocharger, compare the boost pressure with a reference value pre-input to the controller, and correct the operating amount of a compressor of the turbocharger.

In driving of the boosting apparatus, the controller may control the supercharger based on the amount of air detected by a detection unit.

In driving of the boosting apparatus, the controller may confirm whether or not the supercharger is driven and control the supercharger according to the driving map pre-input to the controller, upon confirming that the supercharger is driven.

EGR gas introduced into the engine may be supplied through an exhaust gas circulation line passing through the supercharger from the end of a regenerative device.

In the correcting of the operating amounts of the boosting apparatus, the controller, if a difference in the amounts of EGR gas through control of the EGR valve is generated, may correct the operating amounts of the boosting apparatus.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
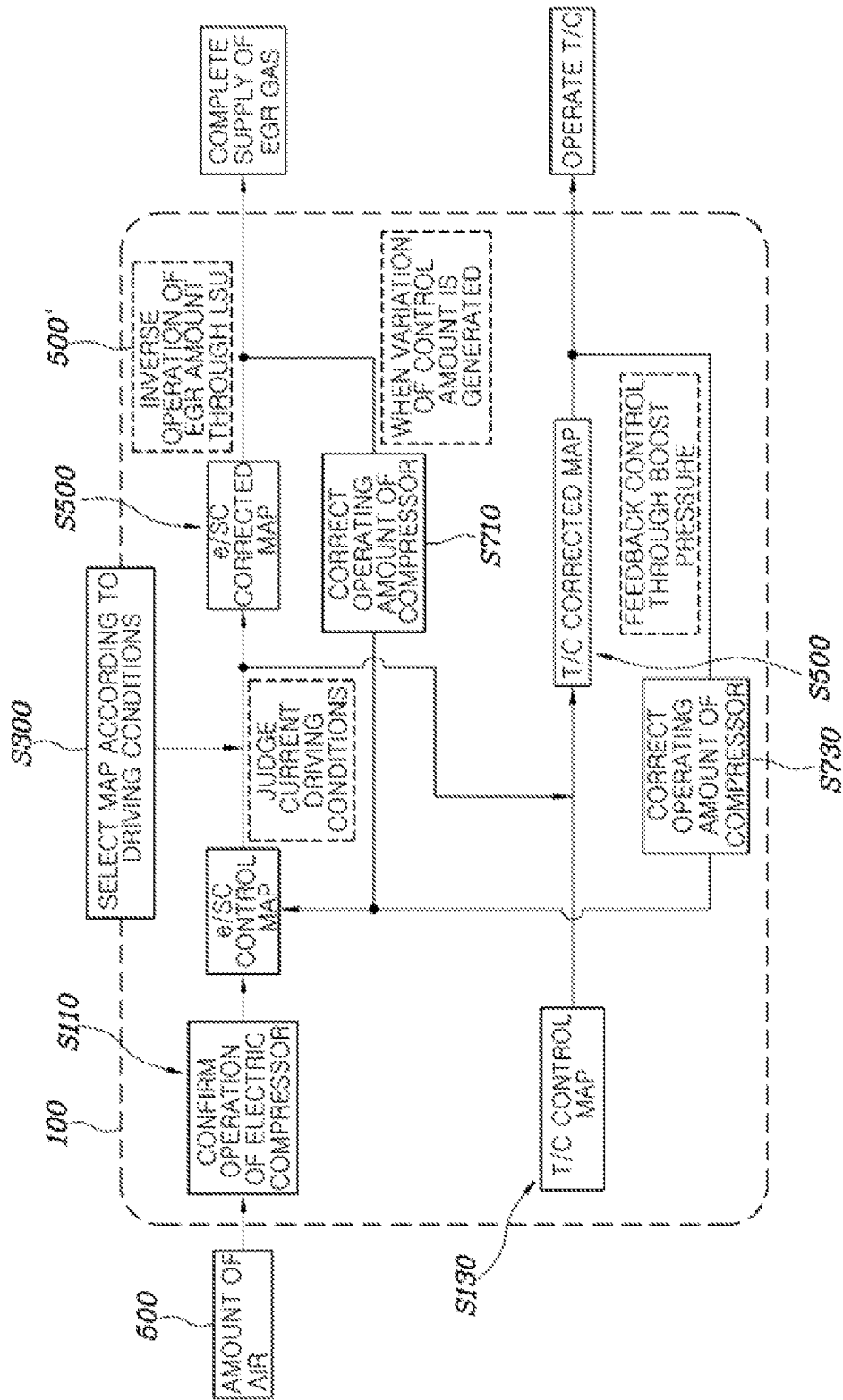
FIG. 1 is a block diagram illustrating a control method of a boosting apparatus.
Figure 2:
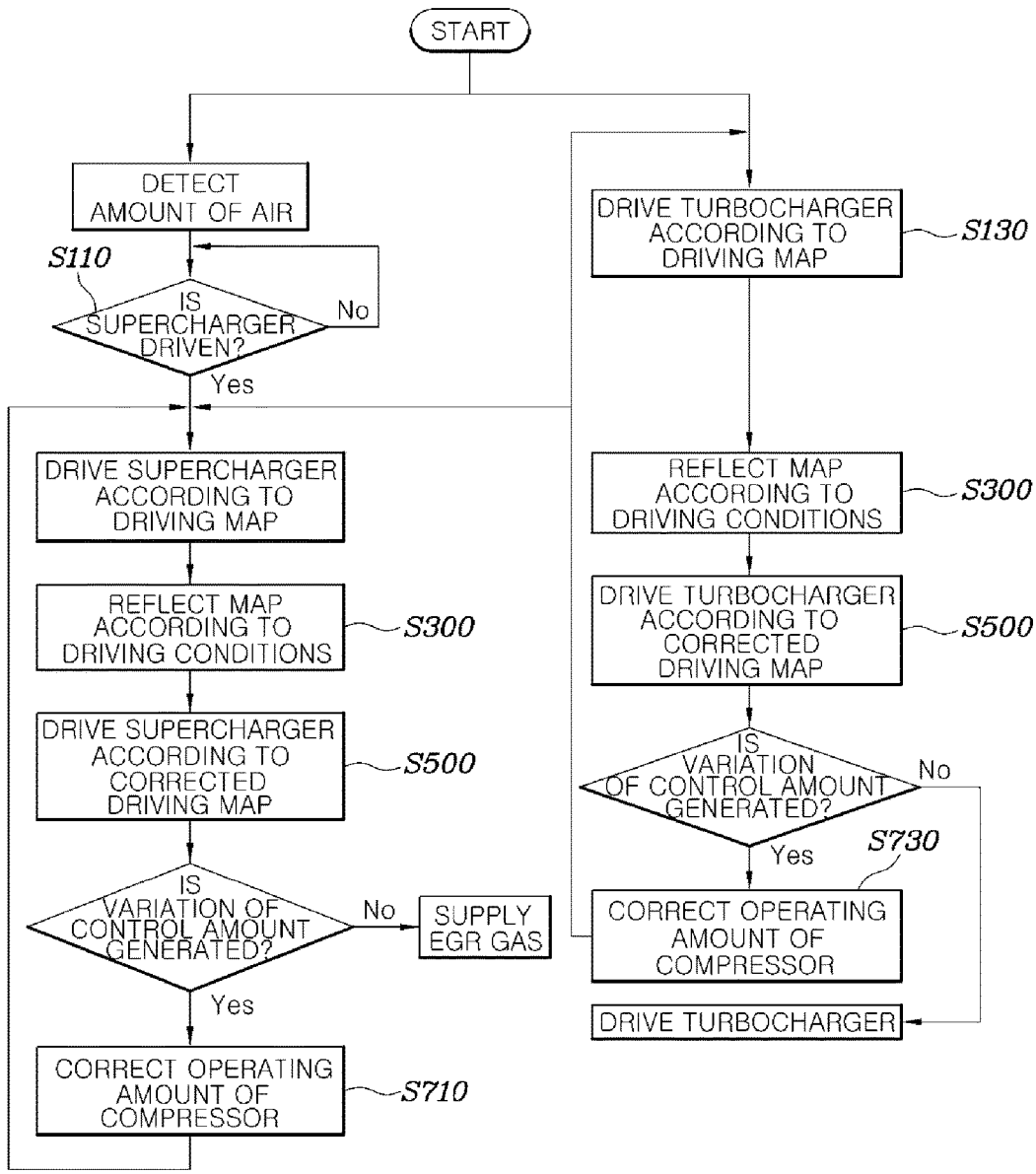
FIG. 2 is a flowchart of the control method of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
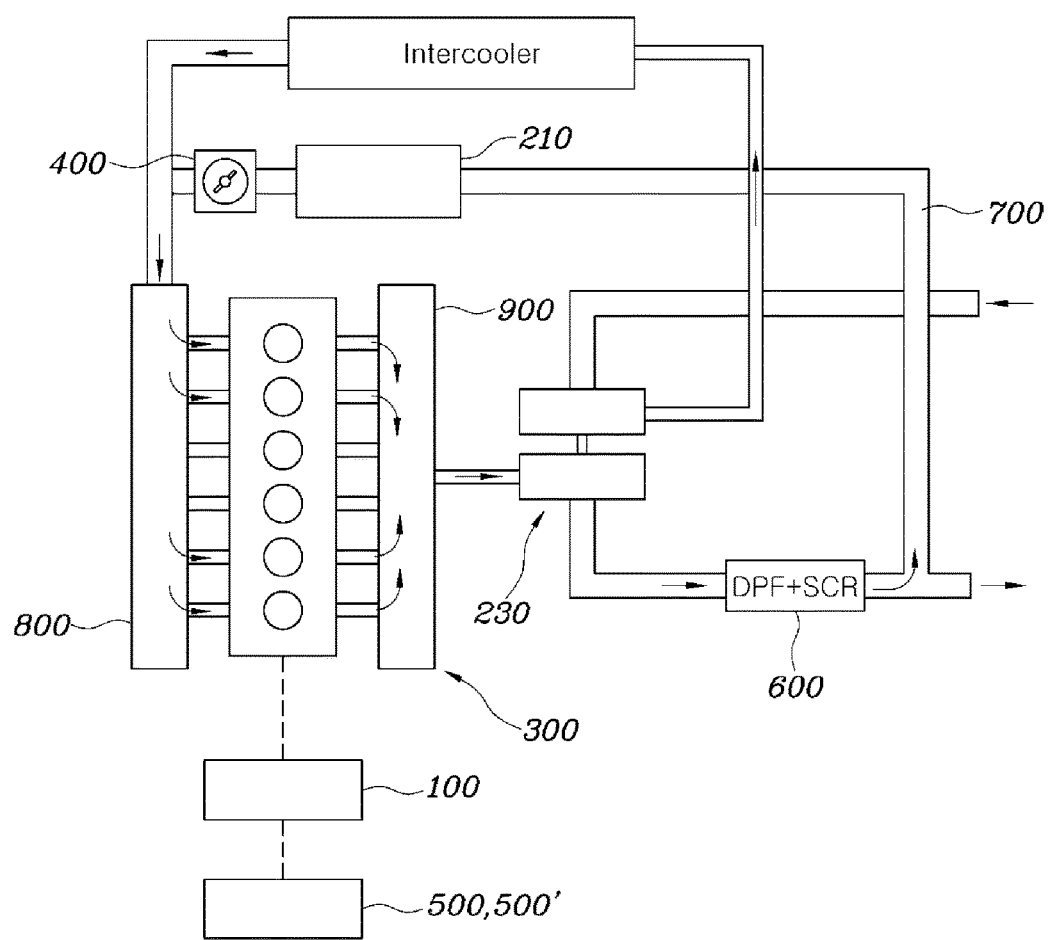
FIG. 3 is a schematic view illustrating the configuration of an engine system to implement the control method of FIG. 1.

An engine system to implement a control method of a boosting apparatus in accordance with one form of the present disclosure is configured, as exemplarily shown in FIG. 3. That is, exhaust gas discharged through an exhaust manifold 900 passes through a turbocharger 230, and exhaust gas passed through the turbocharger 230 passes through a regenerative device 600, is introduced into a supercharger 210 along an exhaust gas circulation line 700, is compressed by a compressor of the supercharger 210 and is then supplied to an intake manifold 800 through an EGR valve 400. The regenerative apparatus 600 may include a diesel particulate filter (DPF) and a selective catalytic reduction (SCR)-catalysator.

Particularly, in the present disclosure, a low pressure to low pressure exhaust gas recirculation (LP to LP EGR) system, which has slow responsiveness and is thus difficult to control, is converted into a low pressure to high pressure exhaust gas recirculation (LP to HP EGR) system and, in order to adjust the supply amount of EGR gas supplied to the engine 300 by the EGR valve 400 according to driving conditions of the engine 300, the supercharger 210 is controlled to maintain proper responsiveness. Further, the open degree of a vane of the EGR valve 400 and the speed of a fan are adjusted by controlling the turbocharger 230 according to the driving conditions of the engine 300 in connection with the supercharger 210, thus controlling the supply amount of EGR gas. Further, the turbocharger 230 may be a variable geometry turbine (VGT) turbocharger which may control the flow rate of exhaust gas introduced into a turbine by a controller 100.

Therefore, a control method of a boosting apparatus includes: driving the boosting apparatus 210, 230 according to driving maps pre-input to a controller 100 (Operations S110 and S130), judging driving conditions of the engine 300, selecting a driving map pre-input to the controller 100 and reflecting the driving conditions in the selected driving map by the controller (Operation S300), correcting the driving maps of the boosting apparatus 210, 230 based on the driving map of the engine 300, in which the driving conditions are reflected in Operation S300, and driving the boosting apparatus 210, 230 based on the corrected driving maps by the controller 100 (Operation S500), and confirming whether or not variations in operating amounts of the boosting apparatus 210, 230 are generated and, upon confirming that variations in operating amounts are generated, correcting the operating amounts of the boosting apparatus 210, 230 and reflecting the corrected operating amounts in the driving maps by the controller (Operations S710 and S730). Thereby, the controller 100 controls the EGR valve 400 according to driving conditions through operation of the boosting apparatus 210 and 230, thus controlling the amount of EGR gas supplied to the engine 300.

In the above-described control method, the boosting apparatus 210, 230 includes the supercharger 210 and the turbocharger 230. The supercharger 210 and the turbocharger 230 are simultaneously controlled by the controller 100. Here, by properly controlling the supercharger 210 and the turbocharger 230 according to the driving conditions of the engine 300 in connection with the supercharger 210, the amount of EGR gas supplied to the engine 300 may be more accurately controlled so that the engine 300 may be driven in an improved state.

In driving of the boosting apparatus 210, 230 (Operations S110 and S130), the boosting apparatus 210, 230 is driven according to driving maps pre-input to the controller 100. Driving of the boosting apparatus 210, 230 (Operations S110 and S130) may be divided into driving the supercharger 210 (Operation S110) and driving the turbocharger 230 (Operation S130).

In driving of the supercharger 210 (Operation S110), the controller 100 may control the supercharger 210 based on the amount of air detected by a detection unit 500. The detection unit 500 may be an air flow sensor and, particularly, a hot film type air flow sensor. The controller 100 calculates the supply amount of EGR gas supplied to an intake side based on the amount of air detected by the air flow sensor and thus controls the supply amount of EGR gas.

When driving of the engine 300 is started, the controller 100 may detect the amount of air introduced into the intake side through the detection unit 500. In driving of the super charter 210 (Operation S110), the controller 100 confirms whether or not the supercharger 210 is driven and controls the supercharger 210 according to the driving map of the supercharger 210 pre-input to the controller 100 based on the RPM and torque of the engine 300 upon confirming that the supercharger 210 is driven.

In a similar manner, in driving of the turbocharger 230 (Operation S130), the controller 100 controls the turbocharger 230 according to the driving map of the turbocharger 230 pre-input to the controller 100 based on the RPM and torque of the engine 300.

After execution of driving of the boosting apparatus S210, S230 (Operations S110 and S130), the controller judges driving conditions of the engine 300, selects a driving map pre-input to the controller 100 and reflects the driving conditions in the selected driving map (Operation S300). Here, the controller 100 confirms whether or not the engine 300 enters a transient section by checking changes according to time, or judges driving conditions which may be generated in the engine 300, for example, driving in an eco mode, a normal mode or a sports mode, or a Lean NOx Trap (LNT) rich state during regeneration of a diesel particulate filter (DPF).

Therefore, the controller 100 corrects the driving maps of the boosting apparatus 210, 230 based on the driving map of the engine 300, in which the driving conditions of the engine 300 are reflected in Operation S300, and the controller 100 drives the boosting apparatus 210, 230 based on the corrected driving maps (Operation S500).

According to execution of driving of the boosting apparatus 210, 230 based on the corrected driving maps (Operation S500), the boosting apparatus 210 and 230 is driven based on the corrected maps and the controller 100 controls the EGR valve 400 so as to supply EGR gas to the intake side.

Further, the controller 100 confirms whether or not variations in operating amounts of the boosting apparatus 210, 230 occur and, upon confirming the occurrence of variations in operating amounts, corrects the operating amounts of the boosting apparatus 210, 230 and reflects the corrected operating amounts in the driving maps (Operations S710 and S730). In correcting the operating amounts (Operations S710 and S730), the controller 100, if a difference of the supply amounts of EGR gas through control of the EGR valve 400 occurs, corrects the operating amounts of the boosting apparatus 210 and 230 to control the supply amount of EGR gas supplied to the intake side of the engine 300.

Correction of the operating amounts (Operations S710 and S730) will be described in more detail. Correction of the operating amounts (Operations S710 and S730) may be divided into correcting the operating amount of the supercharger 210 (Operation S710) and correcting the operating amount of the turbocharger 230 (Operation S730).

In order to correct the supercharger 210 (Operation S710), the controller 100 corrects the operating amount of the supercharger 210 by executing inverse operation of the supply amount of EGR gas based on the amount of oxygen in the exhaust gas detected by a detection unit 500', and controlling the open degree of the EGR valve 400 accordingly. Here, the detection unit 500' may be an oxygen sensor (a lambda sensor or O2 sensor). The detection unit 500' may detect the amount of oxygen in exhaust gas and transmit the detected amount of oxygen to the controller 100 and thus, the controller 100 may execute inverse operation of a proper supply amount of EGR gas and supply EGR gas to the intake side. In the step of correcting the supercharger 210 (Operation S710), if no variation in the control amount of the supercharger 210 is generated, the controller supplies the supply amount of EGR gas, acquired by inverse operation through the detection unit 500', to the intake side of the engine 300.

In the step of correcting the turbocharger 230 (Operation S730), the controller 100 receives the boost pressure of the turbocharger 230, compares the boost pressure with a reference value pre-input to the controller 100, and corrects the operating amount of a compressor of the turbocharger 230 to correct the operating amount of the turbocharger 230. Further, when the turbocharger 230 is corrected (Operation S730), the corrected value of the operating amount of the turbocharger 230 is reflected in the driving map of the supercharger 210 and thus the operating amount of the supercharger 210 is controlled accordingly and, thereby, the supply amount of EGR gas supplied to the intake side of the engine 300 is controlled by controlling the EGR valve 400. In the step of correcting the turbocharger 230 (Operation S730), if correction of the turbocharger 230 is not required, the turbocharger 230 is continuously driven at the same RPM.

As is apparent from the above description, an LP to LP EGR system having slow responsiveness may be replaced with an LP to HP EGR system and thus the supply amount of EGR gas may maintain proper responsiveness by controlling an electrically driven supercharger.

Further, by controlling the supercharger and a turbocharger according to driving conditions of an engine therein, the open degree of an EGR valve vane or the speed of a fan may be controlled to accurately supply the amount of EGR gas to the intake side of the engine.

That is, by controlling a compressor of the supercharger and, more particularly, the electrically driven supercharger, the turbocharger may be controlled according to the driving conditions of the engine in connection with the supercharger, thus improving the control of the amount of EGR gas supplied to the intake side of the engine.

Although the forms of the present disclosure have been disclosed for illustrative purposes, those skilled in the art will appreciate that various modifications, additions and substitutions are possible, without departing from the scope and spirit of the present disclosure.

What is claimed is:

1. A control method of a boosting apparatus, comprising:
   driving the boosting apparatus according to driving maps pre-input to a controller, the boosting apparatus including a supercharger and a turbocharger;
   judging driving conditions of an engine, selecting a driving map pre-input to the controller and reflecting the driving conditions in the selected driving map by the controller;
   correcting the driving maps of the boosting apparatus based on the selected driving map, in which the driving conditions are reflected, and driving the boosting apparatus based on the corrected driving maps by the controller; and
   confirming whether variations in operating amounts of the boosting apparatus are generated and, upon confirming that variations in operating amounts are generated, correcting the operating amounts of the boosting apparatus and reflecting the corrected operating amounts in the driving maps by the controller,
   wherein the supercharger is disposed in an exhaust gas circulation line, and the controller is configured to control an exhaust gas recirculation (EGR) valve according to the driving conditions through operation of the supercharger and the turbocharger and thus control an amount of EGR gas supplied to the engine.

2. The control method according to claim 1, wherein the supercharger and the turbocharger are simultaneously controlled.

3. The control method according to claim 2, wherein, in the correcting the operating amounts of the boosting apparatus, a corrected value of an operating amount of the turbocharger is reflected in a driving map of the supercharger and thus an operating amount of the supercharger is controlled.

4. The control method according to claim 2, wherein the controller is configured to correct an operating amount of the supercharger by executing inverse operation of the amount of EGR gas based on an amount of oxygen in exhaust gas detected by a detection unit and thus control an open degree of the EGR valve.

5. The control method according to claim 2, wherein, in the correcting the operating amounts of the boosting apparatus, the controller is configured to receive a boost pressure of the turbocharger, compare the boost pressure with a reference value pre-input to the controller, and correct an operating amount of a compressor of the turbocharger.

6. The control method according to claim 5, in the step of correcting the turbocharger, when the correction of the turbocharger is not required, the turbocharger is continuously driven at a same RPM.

7. The control method according to claim 2, wherein, in the driving the boosting apparatus, the controller is configured to control the supercharger based on an amount of air detected by a detection unit.

8. The control method according to claim 2, wherein, in the driving the boosting apparatus, the controller is configured to confirm whether or not the supercharger is driven and control the supercharger according to the driving maps pre-input to the controller, upon confirming that the supercharger is driven.

9. The control method according to claim 2, wherein the EGR gas introduced into the engine is supplied through the exhaust gas circulation line passing through the supercharger from an end of a regenerative device.

10. The control method according to claim 1, wherein, in the correcting the operating amounts of the boosting apparatus, the controller, when a difference in the amounts of EGR gas through control of the EGR valve is generated, is configured to correct the operating amounts of the boosting apparatus.

* * * * *